(12) United States Patent
Valentine et al.

(10) Patent No.: US 6,223,045 B1
(45) Date of Patent: Apr. 24, 2001

(54) SATELLITE DELIVERY OF SHORT MESSAGE SERVICE (SMS) MESSAGES

(75) Inventors: Eric Valentine, Plano; Lee Davidson, McKinney, both of TX (US)

(73) Assignee: Ericsson Inc., Richardson, TX (US)

( * ) Notice: Subject to any disclaimer, the term of this patent is extended or adjusted under 35 U.S.C. 154(b) by 0 days.

(21) Appl. No.: 09/245,637

(22) Filed: Feb. 5, 1999

(51) Int. Cl.$^7$ ...................................................... H04Q 7/20
(52) U.S. Cl. ........................ 455/466; 455/433; 455/412; 455/458
(58) Field of Search ..................... 455/433, 466, 455/414, 412, 413, 560, 12.1, 458; 379/88.22, 88.25

(56) References Cited

U.S. PATENT DOCUMENTS

| | | | |
|---|---|---|---|
| 5,590,396 | * | 12/1996 | Henry ..................................... 455/33.1 |
| 5,628,051 | * | 5/1997 | Salin ..................................... 455/33.1 |
| 5,719,918 | * | 2/1998 | Serbetciouglu et al. ............... 379/58 |
| 5,884,170 | * | 3/1999 | Valentine et al. ..................... 455/433 |
| 5,943,399 | * | 8/1999 | Bannister et al. ................. 379/88.17 |
| 5,966,663 | * | 10/1999 | Gleason ................................. 455/466 |
| 6,014,429 | * | 1/2000 | LaPorta et al. .................... 379/88.15 |
| 6,057,782 | * | 5/2000 | Koenig ............................. 340/825.44 |

* cited by examiner

*Primary Examiner*—Edward F. Urban
*Assistant Examiner*—Blane J. Jackson
(74) *Attorney, Agent, or Firm*—Arthur I. Navarro

(57) ABSTRACT

A method of sending a short message service (SMS) message to a mobile station operating within a Global System for Mobile Communications (GSM) radio telecommunications network which utilizes a satellite air interface link. A paging server is implemented in the network and interfaced with a mobile switching center/visitor location register (MSC/VLR) serving the mobile station. When a SMS service center receives a mobile-terminating SMS message, it sends the message to the paging server. The paging server stores a copy of the message and sends the message from the paging server to the MSC/VLR. The MSC/VLR makes a first attempt to deliver the message to the mobile station via the satellite air interface radio link. If the SMS service center times out before receiving an acknowledgment that the message was delivered, the service center sends the message to the paging server a second time. Upon receipt, the paging server determines whether the message received the second time has already been sent to the MSC/VLR. If so, the paging server discards the message received the second time. If the message received the second time is a new message, the paging server forwards the message to the MSC/VLR for delivery.

15 Claims, 2 Drawing Sheets

SATELLITE DELIVERY OF SHORT MESSAGE SERVICE (SMS) MESSAGES

BACKGROUND OF THE INVENTION

1. Technical Field of the Invention

This invention relates to telecommunication systems and, more particularly, to a method of delivering Short Message Service (SMS) messages to a mobile station via a satellite air interface radio link in a radio telecommunications network.

2. Description of Related Art

FIG. 1 is a simplified block diagram of an existing satellite system based on a Global System for Mobile Communications (GSM) radio telecommunications network 10 illustrating the network nodes involved in delivering SMS messages to a mobile station 13. A satellite link is shown to include a satellite gateway 11, a communication satellite 12, and the MS 13 which may be partially shielded within a structure 14. Within the gateway 11, a Mobile Switching Center/Visitor Location Register (MSC/VLR) 15 is connected to a Base Station Subsystem (BSS) 16 via an A-interface 17. The BSS is modified for use with satellites, and is connected to a Radio Frequency Terminal (RFT) 18 via, for instance, a modified Abis interface 19. The RFT 18 includes an antenna system for tracking and communicating with the satellite 12. The satellite 12 provides an air interface link from the gateway 11 to the MS 13. A feeder link 21 (from the gateway 11 to the satellite 12) typically operates in the Ku-band. A downlink 22 (from the satellite to the MS) typically operates in the Ku-band or L-band. Different bands have different propagation characteristics depending, for instance, on rain attenuation. There is some attenuation of the signal on all bands if the mobile station antenna is not deployed, or if the mobile station 13 is located inside a building.

The network 10 also includes a SMS Service Center (SMS-SC) 23, a Short Message Gateway Mobile Switching Center (SM-GMSC) 24, a Home Location Register (HLR) 25, and a Short Message Interworking Mobile Switching Center (SM-IWMSC) 26 to handle outgoing messages from the network 10.

The air interface link includes a plurality of logical channels such as traffic channels, broadcast channels, dedicated control channels, and various associated channels. In the normal GSM architecture, there is also a single paging channel which accommodates various paging methods using different algorithms such as, for example, global paging, repeated paging, and so forth. Paging over a satellite link, however, poses additional problems which are not typically encountered by paging systems in cellular telecommunications networks. When paging over a satellite link, there is increased attenuation of the signal due to the distance the signal must travel, water vapor in the air, and various power limits imposed on the satellite transceiver. By the time the paging signal reaches the ground, it is likely that the signal will not penetrate walls or other obstructions such as wet foliage.

To address this problem in the past, satellite networks have typically either utilized a higher power level on the satellite, or a separate logical channel has been defined which utilizes different channel coding. Utilizing higher power on the satellite is a problem because satellites are typically power-constrained. The available power on the satellite is one of the major constraints on its throughput, and high power cannot be used for every page because this would decrease the amount of total traffic that the satellite can handle. Therefore, higher power levels are generally utilized sparingly. If a separate logically channel is defined and utilized for paging, it creates other problems because this method is less effective than raising the power level, and less information can be carried by the paging signal since additional coding must be used on the channel.

Satellite paging systems also suffer from reliability problems caused, once again, by the attenuation of the signal and the inability to page the mobile station when the mobile station is in a disadvantaged mode (i.e., the mobile station is in a shielded location and/or the mobile station antenna is not raised). This can lead to lost messages or, if the network takes corrective action as described below, the same message may be delivered more than once.

In order to overcome the disadvantage of existing solutions, it would be advantageous to have a method of paging mobile stations in a satellite radio telecommunications network which uses high power paging only when needed, and conserves satellite power by using lower power at other times. In addition, it would be advantageous for such a paging system to reliably deliver SMS messages to the paged mobile station without delivering the same message more than once. The present invention provides such a method.

SUMMARY OF THE INVENTION

In one aspect, the present invention is a method of sending a short data message to a mobile station operating in a radio telecommunications network. The network includes a mobile switching center/visitor location register (MSC/VLR) serving the mobile station. The method includes the steps of sending the message from a message service center to a paging server associated with the MSC/VLR, storing a copy of the message in the paging server, sending the message from the paging server to the MSC/VLR, and delivering the message from the MSC/VLR to the mobile station via an air interface radio link. The paging server may be co-located with the MSC/VLR or may communicate with it using a communication protocol such as Mobile Application Part (MAP).

In another aspect, the present invention is a method of sending a short data message to a mobile station operating in a radio telecommunications network having a mobile switching center/visitor location register (MSC/VLR) serving the mobile station. The method includes the steps of sending the message from a message service center to a paging server associated with the MSC/VLR, storing a copy of the message in the paging server, sending the message from the paging server to the MSC/VLR, and making a first attempt to deliver the message from the MSC/VLR to the mobile station via an air interface radio link. This is followed by sending the message a second time from the message service center to the paging server, determining in the paging server whether the message received the second time has already been sent to the MSC/VLR, and discarding by the paging server, the message received the second m 1Utime upon determining that the message has already been sent to the MSC/VLR.

In yet another aspect, the present invention is a paging server in a radio telecommunications network having a Short Message Service (SMS) service center, a mobile switching center/visitor location register (MSC/VLR) which serves a mobile station, and an air interface radio link between the MSC/VLR and the mobile station. The paging server includes means for receiving from the SMS service center a SMS message directed to the mobile station, and a memory for storing the received SMS message. An interface between the paging server and the MSC/VLR includes means for sending the received SMS message to the MSC/VLR, and means for receiving messages from the MSC/VLR indicating whether the SMS message was successfully delivered to the mobile station. The paging server also includes means for comparing received SMS messages with SMS messages already stored in the memory, and means for discarding received SMS messages that are already stored in the memory.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

Figure 1:
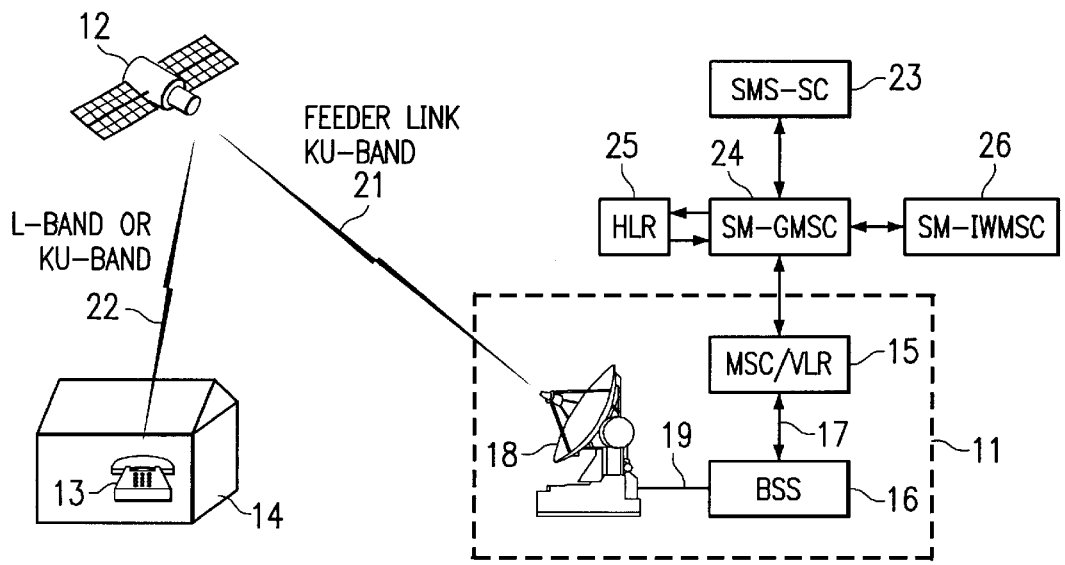
FIG. 1 (Prior Art) is a simplified block diagram of an existing satellite system based on a Global System for Mobile Communications (GSM) radio telecommunications network illustrating the network nodes involved in delivering SMS messages to a mobile station.
Figure 2:
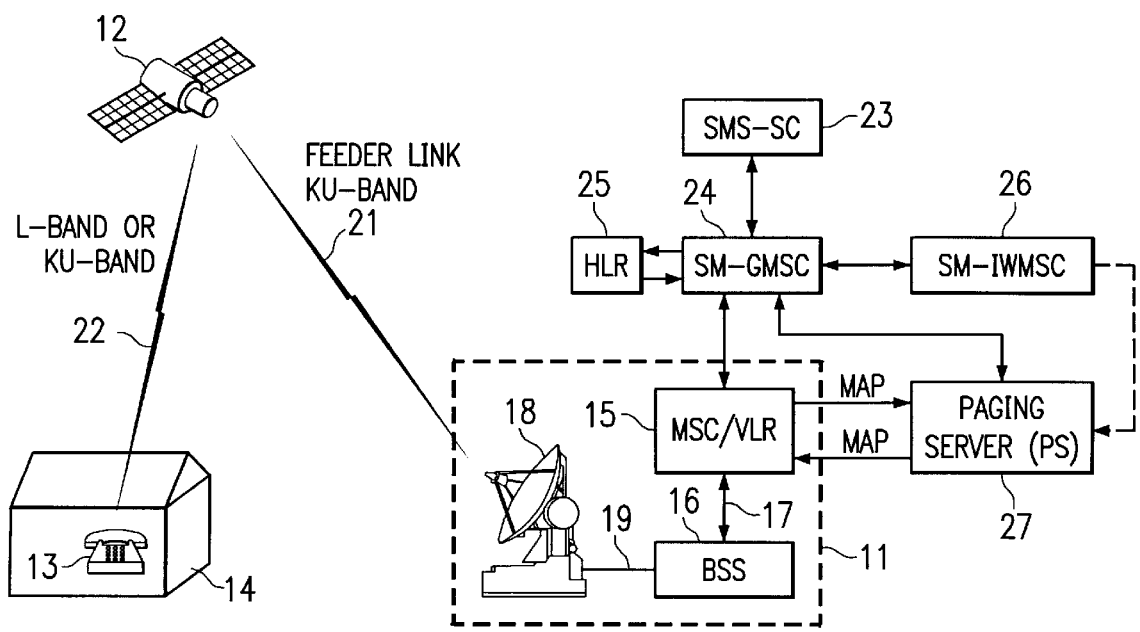
FIG. 2 is a simplified block diagram of a satellite GSM radio telecommunications network which has been modified in accordance with the teachings of the present invention.

FIG. 2 is a simplified block diagram of a satellite GSM radio telecommunications network which has been modified in accordance with the teachings of the present invention. The present invention utilizes the SMS components that are part of the basic GSM architecture to implement an improved satellite messaging paging system which conserves satellite power by using high power paging only to pass paging indications to mobile stations in disadvantaged mode, and using lower power to transmit the actual message. In addition, the present invention reliably delivers SMS messages to the paged mobile station without delivering the same message more than once.

In the present invention, the network includes the SMS Service Center (SMS-SC) 23, the Short Message Gateway Mobile Switching Center (SM-GMSC) 24, the Home Location Register (HLR) 25, and the Short Message Interworking Mobile Switching Center (SM-IWMSC) 26 as in existing GSM networks. In addition, the present invention implements a Paging Server (PS) 27.

In existing GSM networks that do not employ high powered paging, the following procedures are utilized to deliver a SMS message to a mobile station. When a SMS message for the mobile station 13 is either generated in, or arrives at, the SMS-SC 23, the SMS-SC 23 must determine the location of the addressed mobile station 13. Therefore, the SMS-SC 23 forwards the message based on the subscriber's address to the SM-GMSC 24. At the same time, the SMS-SC 23 starts an acknowledgment timer for receiving an acknowledgment that the message was delivered. If the timer expires before receiving an acknowledgment, the SMS-SC 23 tries to deliver the message again.

When the SM-GMSC 24 receives the SMS message, the SM-GMSC 24 queries the HLR 25 to determine the location of the mobile station 13. This is a slightly different query than the query normally utilized for call delivery because the only information needed in this case is the identity of the Visitor Location Register (VLR) 15 in which the mobile station 13 is located. The HLR 25 returns to the SM-GMSC 24 the identity of the mobile station's VLR, and the SM-GMSC 24 forwards the message to the MSC-VLR 15 where the mobile station 13 is located. These transactions are conducted using Signaling System Number 7 (SS7) and the Mobile Application Part (MAP).

When the SMS message is received in the MSC/VLR 15, the MSC/VLR 15 first checks to see if the called subscriber is already involved in a call. If the called subscriber is involved in a call, the message is put on an associated signal and sent to the mobile station 13. Otherwise, the mobile station 13 must be paged. In this case, the MSC/VLR 15 sends a page request to the BSS 16 which begins paging the mobile station 13. At the same time that the MSC/VLR 15 sends the message to the BSS 16, a paging timer such as a T.3113 timer is started in the MSC/VLR 15. If the subscriber at the mobile station 13 is in an advantaged mode (i.e., the mobile station antenna is raised, and the subscriber is not located in a shielded (disadvantaged) location), then the mobile station 13 immediately responds to the page request, a channel is seized, and the message is sent. However, if the mobile station 13 is in a disadvantaged mode, the T.3113 timer may time out before an acknowledgment is received. When the T.3113 timer times out, the MSC/VLR 15 tries to send the message again, and the paging process is repeated by the BSS 16. If the second page attempt also fails, then typically the failure is reported back to the SMS-SC 23, and the SMS-SC 23 then sends an instruction to the HLR 25 to set a message-waiting flag. When the mobile station 13 becomes available again, the MSC/VLR 15 notifies the HLR 25 that the mobile station 13 has become available again. The HLR 25 may maintain a list of SMS service centers that have tried to deliver messages. When the HLR 25 is notified that the mobile station 13 is available again, the HLR 25 notifies the applicable SMS-SCs, such as SMS-SC 23, and any waiting messages are sent.

If the GSM network has the capability to utilize high powered paging to deliver messages, there are some disadvantages with the above procedure basically involving the timing of the decision to escalate to high power. As noted above, the SMS-SC 23 starts an acknowledgment timer when the SMS message is first sent to the SM-GMSC 24, and if an acknowledgment is not received prior to the expiration of the timer, then the SMS-SC 23 restarts the procedure, and sends the SMS message again. If the delivery is unsuccessful at first, and the network makes additional attempts to deliver the message by, for example, escalating to high power and waiting for the mobile station 13 to switch from disadvantaged mode to advantaged mode, then the whole process may take so long that the acknowledgment timer in the SMS-SC 23 times out. The SMS-SC 23 then sends the message again, while the network may still be trying to deliver the first message. When the subscriber comes out of disadvantaged mode (for example, by coming out of a building), the subscriber may receive repeating messages.

A potential solution is to attempt delivery of the message the first time, and if the T.3113 timer in the MSC/VLR 15 expires, then the MSC/VLR 15 immediately sends a failure message to the SMS-SC 23 while the MSC/VLR 15 continues to attempt to deliver the message. In this way, the acknowledgment timer in the SMS-SC 23 does not expire, causing the SMS-SC 23 to send the message again. However, this solution ignores the fact that if a failure is reported to 23 the SMS-SC, the message waiting indication is set in the HLR 25, and another situation is created in which the same message may be delivered twice since the message will be sent again when the mobile station becomes available.

Alternatively, when the T.3113 timer in the MSC/VLR 15 expires, the MSC/VLR 15 may immediately report a successful delivery to the SMS-SC while the MSC/VLR 15 continues to attempt to deliver the message. This would prevent the message waiting indication from being set in the HLR 25. However, the SMS-SC 23 is the only place that stores the message for a long period of time, and the SMS-SC 23 erases the message when success is reported. Thus, if a successful delivery is reported, but the 15 MSC/VLR is then unable to deliver the message, then the message is lost. Therefore, in the existing GSM architecture, if success is reported after a T.3113 timeout, the message may be lost, and if failure is reported, the message may be delivered twice.

Thus, utilizing any combination of existing procedures results in either not delivering the message, or delivering it twice. The present invention overcomes the limitations of existing procedures by implementing a paging server 27 that is either located with or internal to the MSC/VLR 15 depending on configuration choice. If the paging server 27 is not internal to the MSC/VLR 15, the preferred interface between the paging server 27 and the MSC/VLR 15 is a MAP interface. The paging server 27 may also be co-located with the SM-GMSC 24 where, by examining the country code and destination code in the called party address of the short message, the paging server 27 determines whether the message is destined for a subscriber in a terrestrial GSM network or a satellite GSM network. If the message is destined for a subscriber in a terrestrial GSM network, the message is handled as in the prior art. If the message is destined for a subscriber in a satellite GSM network, the message is handled as described in the present invention.

The paging server 27 solves the problems experienced by existing GSM-based satellite networks by utilizing several alternative procedures. Basically, all the paging messages intended for the mobile station 13 go through the paging server 27 which keeps track of which messages have been delivered, and which ones have not. Then, as outlined above, a delivery failure may be reported to the SMS-SC 23 after the first T.3113 timeout in the MSC/VLR 15. The MSC/VLR 15 may then continue to attempt to deliver the message to the mobile station 13. The message waiting indication is then set in the HLR 25, and when the mobile station 13 becomes available again, the SMS-SC 23 sends the message again. However, the repeated SMS message is routed to the paging server 27 where it is determined whether or not the message has already been delivered. If the message has been delivered, an acknowledgment is sent to the SMS-SC 23, and the paging server 27 discards the repeated message. If the first message attempt has not yet been delivered, but the MSC/VLR 15 is still attempting to deliver it, the paging server 27 ensures that the message is only delivered once.

Thus, in essence, the paging server 27 functions as a buffer between the SMS-SC 23 and the MSC/VLR 15. By performing message comparisons, the paging server 27 ensures that messages are not lost or delivered more than once.

Signaling is established to ensure that all of the messages intended for the mobile station 13 subscriber go to the paging server 27 by one means or another. In a first embodiment, the SMS message is sent through the MSC/VLR 15 to the paging server 27 and then back again based on network subscription. In a second embodiment, when the HLR 25 is queried to get the VLR where the subscriber is located, the HLR 25 returns a pointer to the paging server 27 rather than the MSC/VLR 15. Then, when the message is sent to the SM-GMSC 24, the SM-GMSC 24 sends the message directly to the paging server 27. Another alternative is to externally route the message from the SM-GMSC 24 through the SM-IWMSC 26 external to the network, using address substitution techniques that point to the paging server 27. Once a message has been routed to the paging server 27 via the MSC/VLR 15, the SM-GMSC 24, or external to the network, the paging server 27 determines whether or not the message has been delivered, and either discards the message, stores the message, or sends it to the MSC/VLR 15 for delivery.

The present invention also provides better control over the utilization of high-power paging. Since the paging server 27 is functioning as a buffer and preventing duplicate delivery requests from reaching the MSC/VLR 15, the MSC/VLR 15 no longer has a time constraint regarding how long it can take before it must return an acknowledgment to the SMS-SC 23. Therefore, a high-power page can be sent to the mobile station 13 following an unanswered normal-power page attempt. In the preferred embodiment, the page includes a flag indicating that the subscriber has a SMS message to be delivered. If the subscriber is in a disadvantaged location, the MSC/VLR 15 then waits for the subscriber to move to an advantaged location and raise the mobile station antenna. This causes a page response to be sent from the mobile station 13 to the MSC/VLR 15. The SMS message is then sent to the mobile subscriber utilizing normal powered traffic channels. If the paging server 27 receives an additional delivery attempt from the SMS-SC 23 during this time period, the paging server 27 determines if a copy of the message already exists in the server. If so, the additional attempt is discarded since a high powered page attempt is already outstanding.

Figure 3:
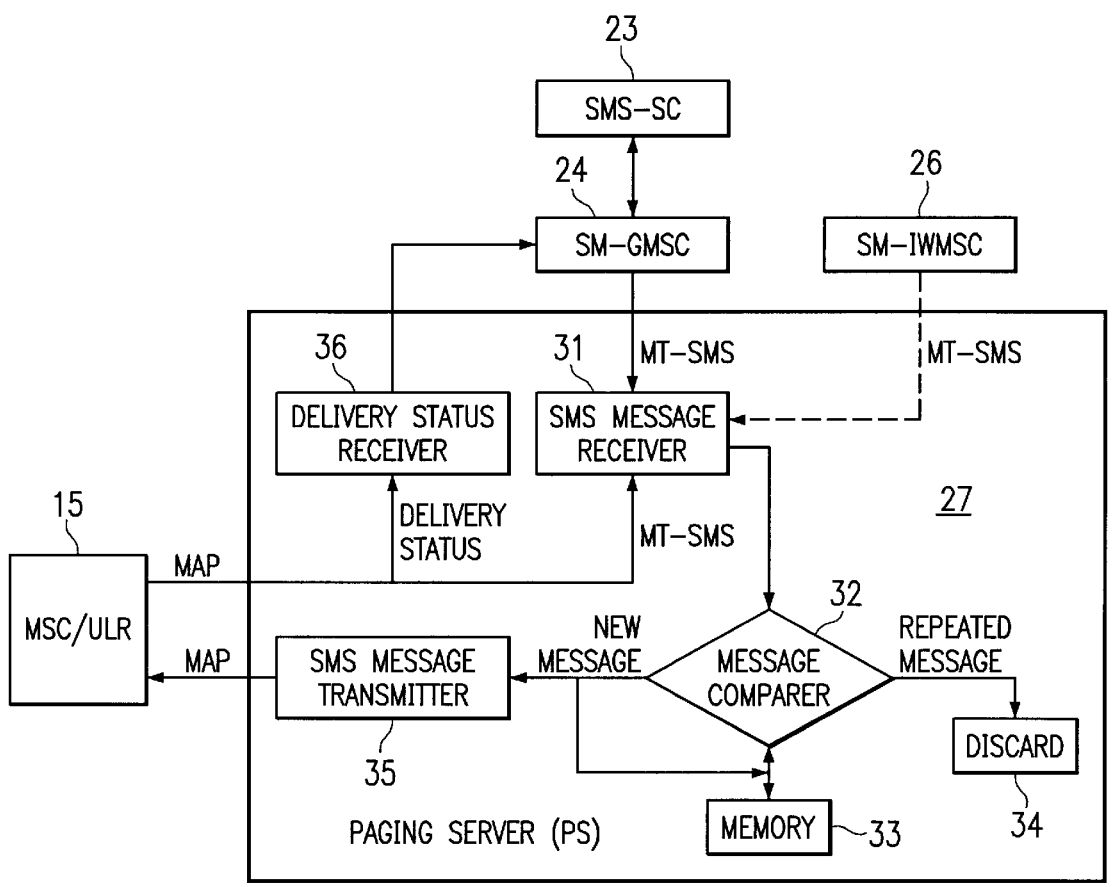
FIG. 3 is a simplified block diagram of the paging server of the present invention.

FIG. 3 is a simplified block diagram of the paging server 27 of the present invention. A SMS message receiver 31 may receive a mobile-terminating SMS message (MT-SMS) by one of three routes: (1) over the MAP interface from the MSC/VLR 15, (2) directly from the SM-GMSC 24, or (3) from the SM-IWMSC 26 over a path routed externally to the network. The SMS message receiver 31 passes the received message to a message comparer 32 which compares the received message to messages stored in a memory 33. If the received message is a repeated message, it is discarded by block 34. If the received message is a new message, it is stored in the memory 33 and sent by a SMS message transmitter 35 to the MSC/VLR 15 for delivery to the mobile station 13 (not shown). The MSC/VLR 15 returns a delivery status message to a delivery status receiver 36 indicating whether or not the SMS message was successfully delivered. This information is returned to the SMS-SC 23 via the SM-GMSC 24.

It is thus believed that the operation and construction of the present invention will be apparent from the foregoing description. While the system and method shown and described has been characterized as being preferred, it will be readily apparent that various changes and modifications could be made therein without departing from the scope of the invention as defined in the following claims.

What is claimed is:

1. A method of sending a short data message to a mobile station operating in a radio telecommunications network, said network including a mobile switching center/visitor location register (MSC/VLR) serving the mobile station, said method comprising the steps of:

sending the message from a message service center to a paging server associated with the MSC/VLR;

storing a copy of the message in the paging server;

sending the message from the paging server to the MSC/VLR;

making a first attempt to deliver the message from the MSC/VLR to the mobile station via an air interface radio link;

sending the message a second time from the message service center to the paging server;

determining in the paging server whether the message received the second time has already been sent to the MSC/VLR; and discarding by the paging server, the message received the second time upon determining that the message received the second time has already been sent to the MSC/VLR.

2. The method of sending a short data message to a mobile station of claim 1 further comprising, after the step of sending the message from the message service center to the paging server, the step of starting an acknowledgment timer in the message service center which times a maximum time period for receiving an acknowledgment in the service center that the message was delivered.

3. The method of sending a short data message to a mobile station of claim 2 further comprising, after the step of making a first attempt to deliver the message from the MSC/VLR to the mobile station, the step of determining in the message service center that the acknowledgment timer has expired.

4. The method of sending a short data message to a mobile station of claim 1 further comprising, after the step of making a first attempt to deliver the message from the MSC/VLR to the mobile station, the steps of:

starting a paging timer in the MSC/VLR which times a maximum time period for receiving an acknowledgment from the mobile station that the message was received;

determining in the MSC/VLR that the paging timer expired before receiving an acknowledgment from the mobile station that the message was received; and making a second attempt to deliver the message from the MSC/VLR to the mobile station.

5. The method of sending a short data message to a mobile station of claim 4 wherein the air interface radio link includes a satellite having a radio link with the mobile station, and the step of making a second attempt to deliver the message from the MSC/VLR to the mobile station includes sending a high powered page attempt from the satellite to the mobile station.

6. The method of sending a short data message to a mobile station of claim 5 wherein the step of sending a high powered page attempt from the satellite to the mobile station includes sending a high powered page with an indication that the mobile station has a message waiting for delivery.

7. The method of sending a short data message to a mobile station of claim 6 further comprising, after sending a high powered page with an indication that the mobile station has a message waiting for delivery, the steps of:

waiting for an extended time period to allow a subscriber time to change the mobile station to an advantaged mode;

receiving a page response from the mobile station; and sending the message to the mobile station on a low powered traffic channel.

8. The method of sending a short data message to a mobile station of claim 1 wherein the short data message is a Short Message Service (SMS) message, and the step of sending the message from a message service center to a paging server includes sending the message from a SMS Service Center (SMS-SC) to the paging server.

9. The method of sending a short data message to a mobile station of claim 8 wherein the step of sending the message from the SMS-SC to the paging server includes routing the message through the MSC/VLR to the paging server.

10. The method of sending a short data message to a mobile station of claim 8 wherein the step of sending the message from the SMS-SC to the paging server includes routing the message through a SMS Gateway Mobile Switching Center (SM-GMSC) directly to the paging server.

11. The method of sending a short data message to a mobile station of claim 4 further comprising the step of integrating the paging server into the SM-GMSC.

12. The method of sending a short data message to a mobile station of claim 1 further comprising the step of integrating the paging server into the MSC/VLR.

13. The method of sending a short data message to a mobile station of claim 1 further comprising the step of interfacing the paging server with the MSCNLR via a Mobile Application Part (MAP) interface.

14. A paging server in a radio telecommunications network having a Short Message Service (SMS) service center, a mobile switching center/visitor location register (MSC/VLR) which serves a mobile station, and an air interface radio link between the MSC/VLR and the mobile station, said paging server comprising:

means for receiving a SMS message from the SMS service center, said SMS message being directed to the mobile station;

a memory for storing the received SMS message;

interface means for interfacing with the MSC/VLR, said interface means including:

means for sending the received SMS message to the MSC/VLR; and means for receiving messages from the MSC/VLR indicating whether the SMS message was successfully delivered to the mobile station;

means for comparing received SMS messages with SMS messages already stored in the memory; and means for discarding received SMS messages that are already stored in the memory.

15. The paging server of claim 14 further comprising means for notifying the SMS service center whether the SMS message was successfully delivered to the mobile station.

* * * * *